Dec. 8, 1931.  A. FRIEDLAND  1,835,642
MOTION PICTURE SCREEN
Filed July 10, 1930

Inventor
ANATOLE FRIEDLAND,
By
Attorney

Patented Dec. 8, 1931

1,835,642

UNITED STATES PATENT OFFICE

ANATOLE FRIEDLAND, OF NEW YORK, N. Y.

MOTION PICTURE SCREEN

Application filed July 10, 1930. Serial No. 466,905.

This invention relates to motion picture projection screens, more especially screens adapted for use with a performance involving the action of live actors.

It is a particular object of my invention to devise a projection screen on which a series of images representing certain live actors is shown. I so arrange my screen that the live actors may pierce the same at the position where their images are being shown, so that a person attending the performance will at one moment view the images of the actors on the screen, and the next moment will see their actual live forms on the stage in front of the screen.

Figure 1:
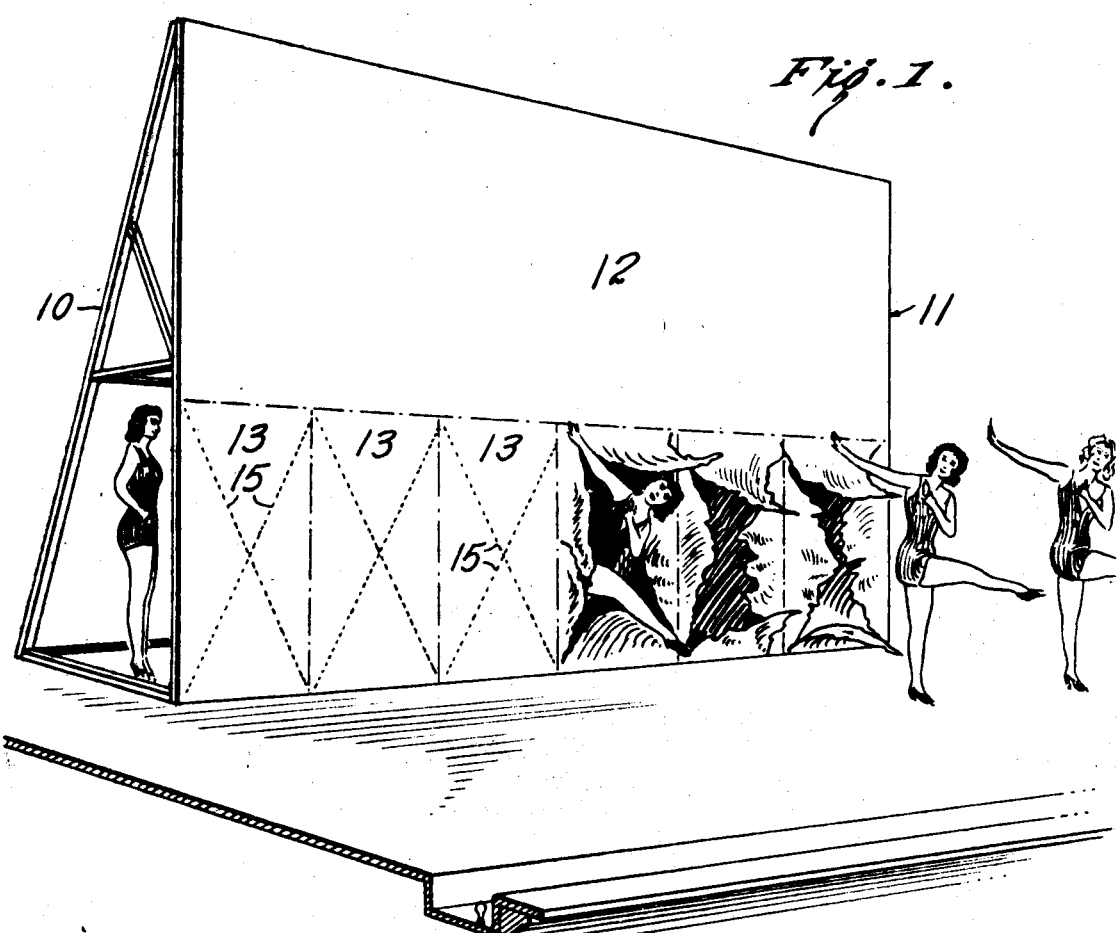
Figure 2:
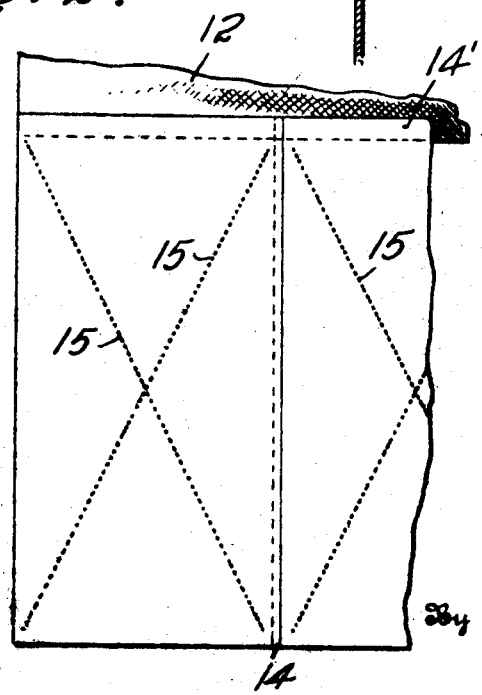
Figure 3:
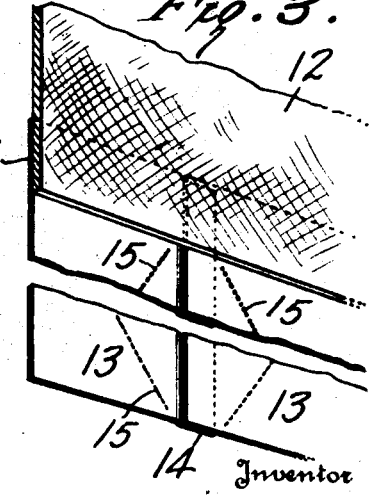

Other objects of the invention will be apparent from a review of the following specification and drawings, wherein Fig. 1 is a perspective view of my projection screen showing a live actor piercing the same. Fig. 2 is a fragmentary view of the screen and Fig. 3 is a rear perspective view showing in detail the construction of the screen.

Referring now more particularly to the drawings, it will be noticed that I utilize a series of supporting or frame members 10 upon which the body of the screen or the projection surface 11 is mounted. The upper portion of the screen is composed of a permanent canvas surface 12, permanently attached thereto, this surface forming a portion only of the screen surface of this invention. Below this canvas section 12, I prefer to mount a series of paper drops or sections 13 which are of substantially the same color as the canvas, so that the entire screen will present a homogeneous surface to the observer. These sections 13 are pasted together as shown at 14 on Fig. 3 and to the canvas portion 12 as at 14' and are easily removed and replaced with a minimum of expense. The paper is waxed and may be arranged with a series of perforations 15 as shown in the drawings, so that a body of an actor may be projected therethrough with great facility and with practically no noise. This lack of noise will be due, as is readily understood, to the waxing of the paper and the presence of the perforations.

By arranging these waxed and perforated paper portions below the canvas section 12, I thus obtain perforable portions which will allow for the projection of a motion picture thereupon of a quality equal to that of the projection on the canvas. This arrangement will also allow for the easy and cheap replacement of this waxed paper so that the same may be easily replaced for each succeeding performance.

In actual use, it will be understood that a motion picture will be cast upon the screen and its size will be so regulated that it will occupy the entire screen; that is, the canvas or permanent portion and the waxed paper or temporary portion. The images will then be reduced in size until they occupy the lower portion of the projection screen or the temporary paper portion. At a given moment in the exhibition of the motion picture film, the live actors who have been hidden behind the screen, will spring through the paper and will appear before the audience in front of the screen as is demonstrated in Fig. 1.

While my invention is disclosed in a rather simple form, it is nevertheless very ingenious and produces a new result and an amusement phenomenon which is greatly appreciated. Furthermore, it is only by this relatively simple arrangement of elements, which is nevertheless unique and ingenious, that I am able to obtain the results of my invention, and while only one embodiment of the invention is shown, and described in the specification, it should be understood that variations of the same within the scope of the appended claims will readily occur to one skilled in the art.

I claim:

1. A motion picture projection screen comprising a frame and a surface adapted to receive the projection of a film, a portion of said screen surface being composed of a relatively strong canvas material permanently attached to said frame, a portion of said screen being composed of a waxed paper material relatively weak and perforable, said waxed paper portion being temporarily attached to said frame and initially perforated at designated points whereby it may be readily traversed by human bodies physically and forcibly projected thereagainst at said designated points.

2. A motion picture projection screen comprising a frame and a surface adapted to receive the projection of a film, the upper horizontal portion of said screen surface being composed of a relatively strong material permanently attached to said frame, the lower horizontal portion of said screen being composed of a relatively weak and perforable material, said weakened portion and said permanent portion being composed of material harmonizing in color, said weakened portion being of a waxed material, initially perforated at designated points whereby it may be readily and noiselessly traversed by human bodies projected thereagainst at said designated points.

Signed at New York city, in the county of New York and State of New York.

ANATOLE FRIEDLAND.